(12) United States Patent
Tafoya

(10) Patent No.: US 9,581,502 B2
(45) Date of Patent: Feb. 28, 2017

(54) TEMPERATURE CONTROL APPARATUS

(76) Inventor: David Jonathan Tafoya, Maple Grove, MN (US)

(*) Notice: Subject to any disclaimer, the term of this patent is extended or adjusted under 35 U.S.C. 154(b) by 638 days.

(21) Appl. No.: 13/613,775

(22) Filed: Sep. 13, 2012

(65) Prior Publication Data

US 2014/0072014 A1    Mar. 13, 2014

(51) Int. Cl.
    *G01K 7/00* (2006.01)
    *G01K 1/08* (2006.01)

(52) U.S. Cl.
    CPC ....................... *G01K 1/08* (2013.01)

(58) Field of Classification Search
    USPC ............. 374/208, 209; 361/816, 818
    See application file for complete search history.

(56) References Cited

U.S. PATENT DOCUMENTS

| | | | | |
|---|---|---|---|---|
| 3,887,781 A | * | 6/1975 | Peters, Jr. ................ | 219/627 |
| 4,659,236 A | * | 4/1987 | Hobbs ....................... | 374/208 |
| 5,829,880 A | * | 11/1998 | Diedrich ................. | G01K 13/02 |
| | | | | 285/93 |
| 6,948,847 B2 | * | 9/2005 | Pihet et al. ................. | 374/178 |
| 6,997,605 B2 | * | 2/2006 | Trapp .................... | B60H 1/00792 |
| | | | | 374/141 |
| 7,084,342 B2 | * | 8/2006 | Schuh ..................... | G01K 7/13 |
| | | | | 136/224 |
| 2009/0141771 A1 | * | 6/2009 | Owen et al. ............... | 374/178 |
| 2010/0322286 A1 | * | 12/2010 | Toyama et al. .............. | 374/179 |
| 2011/0019714 A1 | * | 1/2011 | Perry ................... | B29C 45/14639 |
| | | | | 374/183 |

* cited by examiner

*Primary Examiner* — Lisa Caputo
*Assistant Examiner* — Nasir U Ahmed
(74) *Attorney, Agent, or Firm* — Condo Roccia Koptiw LLP

(57) ABSTRACT

A temperature control apparatus includes a temperature monitoring integrated circuit (IC). The temperature monitoring IC has an output pin and is configured to generate an output signal having a voltage dependent on a sensed temperature. An output terminal is operatively connected to the output pin. An insulating material substantially surrounds the temperature monitoring IC. The insulating material substantially insulates the temperature monitoring IC from ambient heat and electromagnetic interference.

12 Claims, 2 Drawing Sheets

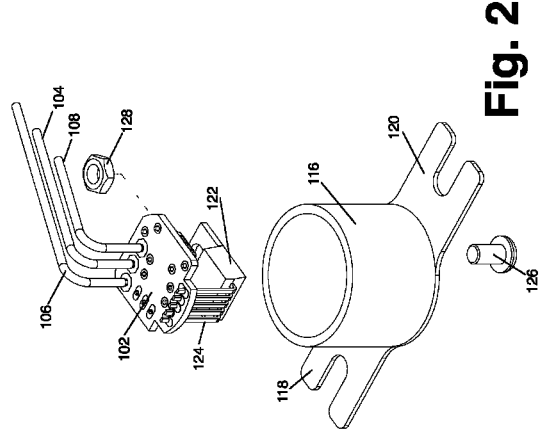
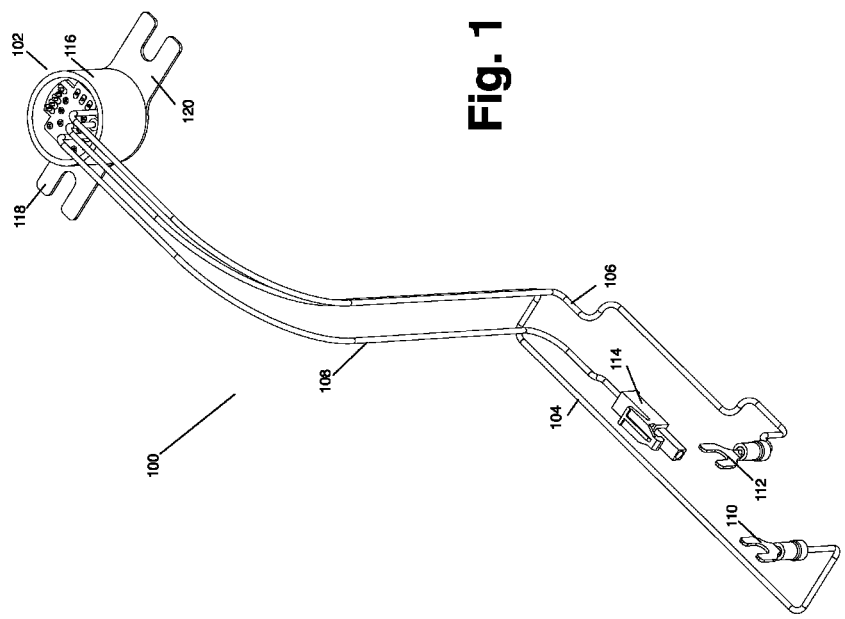

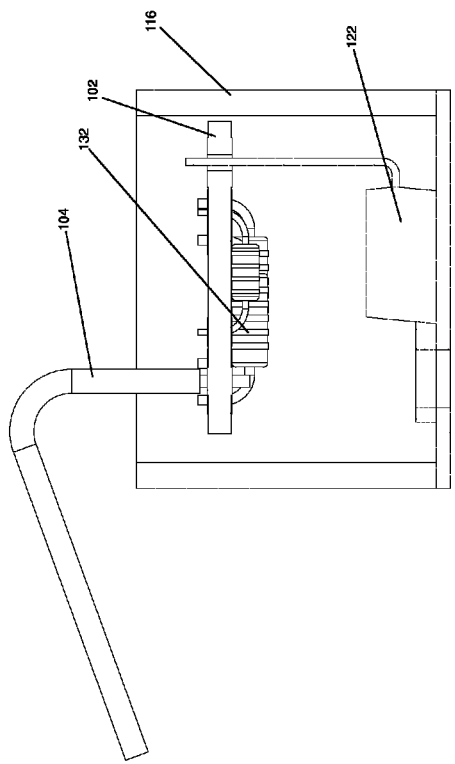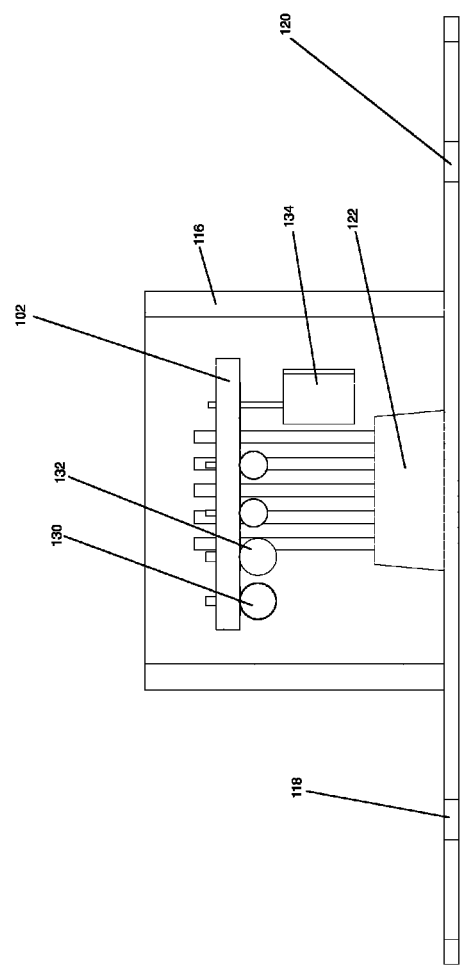

TEMPERATURE CONTROL APPARATUS

TECHNICAL FIELD

This disclosure relates generally to industrial controls. More particularly, the disclosure relates to temperature control of industrial processes.

BACKGROUND

Some industrial processes are sensitive to temperature. For example, some plastic manufacturing processes require that a material be kept within a relatively narrow temperature range for a period of time.

Some conventional industrial processes use mechanical means, such as a bimetal thermostat, to regulate temperature. Bimetal thermostats exploit the differential expansion of two metals to actuate a switch. In this way, a cooling or heating system can be activated if the sensed temperature becomes too high or too low. While bimetal thermostats are reliable and offer good enough control for home heating and cooling applications, they do not offer sufficiently precise control for some industrial processes. Further, bimetal thermostats are characterized by significant hysteresis to prevent frequent powering and depowering of, for example, a heater. While this characteristic is desirable in home heating applications, it yields poor control for temperature-sensitive applications, such as industrial processes. Other mechanical means for regulating temperature, such as pneumatic thermostats, also offer imprecise control.

Other conventional industrial processes use programmable logic controllers (PLCs) to regulate temperature. For example, a PLC may be connected to a thermocouple via an analog-to-digital converter (ADC) that converts the analog voltage signal generated by the thermocouple to a digital value that can be used by the PLC to control temperature. PLCs offer more precise control than is possible with a bimetal thermostat. However, they are relatively costly.

SUMMARY OF THE DISCLOSURE

According to various example embodiments, a temperature control apparatus includes an integrated circuit (IC) temperature sensor that generates a voltage signal that is indicative of temperature. The IC is encapsulated so that it is substantially insulated from electromagnetic noise and temperature variations in the ambient environment that may otherwise interfere with accurate measurement of temperature in the desired area. The IC outputs a signal having a voltage that is dependent on the sensed temperature. This output voltage can then be used to activate or deactivate other components, such as a heating component or a cooling component.

One embodiment is directed to a temperature control apparatus. The temperature control apparatus includes a temperature monitoring integrated circuit (IC). The temperature monitoring IC has an output pin and is configured to generate an output signal having a voltage dependent on a sensed temperature. An output terminal is operatively connected to the output pin. An insulating material substantially surrounds the temperature monitoring IC. The insulating material substantially insulates the temperature monitoring IC from ambient heat and electromagnetic interference.

The disclosed embodiments may realize certain advantages. For instance, using a temperature monitoring IC to sense temperature allows more precise control and faster switching time relative to, for example, bimetal thermostats. At the same time, a temperature monitoring IC is less expensive than a programmable logic controller.

BRIEF DESCRIPTION OF THE DRAWINGS

FIG. 1 is a plan view illustrating an example temperature control apparatus according to an embodiment.

FIG. 2 is a partially exploded view of a portion of the temperature control apparatus of FIG. 1.

FIG. 3 is a sectional view of the portion of the temperature control apparatus shown in FIG. 2.

FIG. 4 is another sectional view of the portion of the temperature control apparatus shown in FIG. 2.

DETAILED DESCRIPTION

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies.

FIG. 1 illustrates an example of a temperature control apparatus 100 in which the subject matter described above may be implemented. The temperature control apparatus 100 includes a printed circuit board (PCB) 102 on which is mounted an integrated circuit (IC) module (not shown in FIG. 1) that senses temperature. The IC module can be implemented using any of a variety of suitable integrated circuits, including, for example, a Microchip Inc. TC622VAT IC, commercially available from Digi-Key Corp. of Thief River Falls, Minn. An output wire 104, a power supply wire 108, and a wire 106 are connected to the PCB 102. The output wire 104 extends toward additional circuitry, such as a control system (not shown), and is connected to an output terminal 110. The output terminal 110 provides output from the temperature control apparatus 100 to the control system, which can be implemented as a heating or cooling system. The power supply wire 108 is connected by a terminal 114 to a DC power supply, which may be located internally of or externally from the power control apparatus 100. The wire 106 is connected to a low logical signal, for example, a low voltage or ground representing a logical value of zero, by a terminal 112.

The PCB 102 is at least substantially surrounded or encapsulated by a material that substantially insulates the PCB 102 from ambient heat and electromagnetic noise that can otherwise interfere with accurate temperature monitoring. The material also substantially insulates other components from electromagnetic noise that may be generated by the PCB 102, thereby reducing interference with other components. The material is not depicted in FIG. 1 so as to allow for maximum visibility of the PCB 102. Insulation allows the PCB 102 to be used in relatively harsh environments, such as those that are typical to certain industrial processes. By contrast, many conventional temperature monitoring ICs cannot be used in industrial processes because exposure to heat, electromagnetic noise, or other environmental factors can at least compromise temperature readings, if not damage the IC outright. Any of a variety of insulating materials can be used to insulate the PCB 102, including potting material, such as may be formed by combining Epic Resin S7302-01A with Epic Resin S7302-01B, both of which are commercially available from Epic Resins of Palmyra, Wis. In some embodiments, the potting material or other insulating material may have metal particles embedded to insulate and protect the integrated circuit from electromagnetic interference. In some such embodiments, the PCB 102 may be coated or pre-potted with a material that prevents direct contact between the PCB 102 and insulating material with embedded metal particles. The insulating material and PCB 102 are at least substantially encased in a housing 116, which is depicted as including a pair of flanges 118, 120 for attaching the housing 116 to equipment that is to be monitored.

FIG. 2 illustrates various other components of the temperature control apparatus 100. As shown in FIG. 2, a temperature monitoring IC 122 is connected to the PCB 102 by a number of pins shown generally at reference numeral 124, including a logic low signal pin, a power supply pin, and a signal output pin. The temperature monitoring IC 122 outputs a signal having a voltage that is dependent on a temperature sensed at a surface of the temperature monitoring IC 122 that faces and is located proximate to the location at which temperature monitoring is desired. This surface is positioned near the bottom of the housing 116 and is thus less significantly insulated than the rest of the temperature monitoring IC 122, allowing the temperature monitoring IC 122 to obtain temperature measurements. Further, a screw 126 and nut 128 can be employed to secure the housing 116 to the location at which temperature monitoring is desired. The screw 126 can promote a flatter and more direct interface between the temperature monitoring IC 122 and the location at which temperature monitoring is desired than is provided by the proximity of the surface of the temperature monitoring IC 122 and the bottom of the housing 116. The screw 126 may be removed after the temperature control apparatus 100 is installed at the desired location. Alternatively, other means can be employed to secure the temperature monitoring IC 122 to the location at which temperature monitoring is desired, such as a flat weld or glue.

FIGS. 3-4 are sectional views of the temperature monitoring apparatus 100. As shown in FIGS. 3-4, in addition to the temperature monitoring IC 122, resistors 130 and 132 and a transistor 134 are also connected to the PCB 102. By way of example and not limitation, the transistor 134 can be implemented as an NPN switching transistor, part number 2N4401, available from NXP Semiconductors N.V. of Eindhoven, The Netherlands. The signal output by the temperature monitoring IC 122 is provided as an input to the transistor 134, which switches state, e.g., turns on when the voltage of the signal exceeds a threshold. The values of the resistors 130 and 132 determine the output voltage from the temperature monitoring IC 122 that is sufficient to switch the state of the the transistor 134. While FIGS. 3-4 depict the transistor 134 as an NPN transistor, it will be appreciated by those of ordinary skill in the art that the transistor 134 could be implemented using a PNP transistor or a metal oxide semiconductor field effect transistor (MOSFET). Alternatively, a diode arrangement comprising a pair of diodes could be used to implement the functionality of the transistor 134. An NPN transistor may be preferable to a PNP transistor due to its faster response time. A MOSFET may be less preferable due to its higher cost relative to NPN and PNP transistors.

In operation, when the temperature sensed by the temperature monitoring IC 122 is below the threshold set by the resistors 130 and 132, the transistor 134 is off, and a low voltage is presented at the output wire 104. On the other hand, when the temperature is at or above the threshold, the transistor 134 turns on, and a high voltage is presented at the output wire 104. Accordingly, the voltage presented on the output wire 104 can be used to control another component, such as, for example, a heating system or a cooling system. As a particular example, a cooling system could be configured to be activated when a high voltage is presented at the output wire 104, indicating that the temperature is above a given threshold. In some embodiments, an inverter could be used to cause a component to be activated when a low voltage is presented at the output wire 104. Activation and deactivation of components may be achieved, for example, using a solid state relay (SSR) operatively coupled to the output of the transistor 134.

It will be appreciated that the above discussion of the operation of the temperature monitoring apparatus 100 assumes that the transistor 134 is implemented as an NPN transistor. If the transistor 134 is implemented using other technologies, the operation of the temperature monitoring apparatus 100 may differ from the above discussion. For instance, if the transistor 134 is implemented as a PNP transistor, the transistor 134 will present a high voltage at the output wire rather than a low voltage.

In some embodiments, it may be desirable for the threshold to be adjustable. Threshold adjustability can be achieved in a number of ways. For instance, a variable resistor having multiple selectable resistance values or a potentiometer having a continuously variable resistance could be used to provide a variable resistance to adjust the threshold output voltage of the temperature monitoring IC 122 and, thus, the threshold temperature required to turn the transistor 134 on. As another alternative, removable resistor modules having different values could be used to adjust the threshold. Such resistor modules could be installed remotely from the temperature control apparatus 100, for example, on a remotely located control panel.

As another alternative, the output of the temperature monitoring IC 122 can be provided directly to an external component rather than to the transistor 134. In such an embodiment, the external component would receive the signal that indicates the sensed temperature. The external component may have logic that determines how to handle the signal, i.e., when to turn the external component or another component on or off.

As demonstrated by the foregoing discussion, various embodiments may provide certain advantages. For instance, using a temperature monitoring IC to sense temperature allows more precise control and faster switching time relative to, for example, bimetal thermostats. At the same time, a temperature monitoring IC is less expensive than a programmable logic controller.

It will be understood by those who practice the embodiments described herein and those skilled in the art that various modifications and improvements may be made without departing from the spirit and scope of the disclosed embodiments. The scope of protection afforded is to be determined solely by the claims and by the breadth of interpretation allowed by law.

What is claimed is:

1. A temperature control apparatus comprising:
   a printed circuit board (PCB);
   a temperature monitoring integrated circuit (IC) mounted on the PCB, the IC having an output pin and configured to generate an output signal having a voltage dependent on a sensed temperature;
   an output terminal operatively connected to the output pin via a wire; and
   an insulating material encapsulating the temperature monitoring IC and the PCB, the insulating material insulating the temperature monitoring IC from ambient heat and electromagnetic noise.

2. The temperature control apparatus of claim 1, further comprising a housing surrounding the insulating material.

3. The temperature control apparatus of claim 2, wherein the housing has a flange formed thereon for mounting the temperature control apparatus.

4. The temperature control apparatus of claim 1, further comprising a transistor operatively connected to the output terminal and configured to receive the output signal and to generate a signal having a first voltage if a voltage of the output signal is equal to or greater than a threshold voltage, and to generate a signal having a second voltage if the voltage of the output signal is less than the threshold voltage.

5. The temperature control apparatus of claim 4, wherein the transistor comprises at least one of an NPN transistor, a PNP transistor, and a MOSFET.

6. The temperature control apparatus of claim 4, further comprising at least one resistor operatively connected to the transistor and configured to set the threshold voltage.

7. The temperature control apparatus of claim 6, wherein the at least one resistor has a fixed value.

8. The temperature control apparatus of claim 6, wherein the at least one resistor has a variable value.

9. The temperature control apparatus of claim 8, wherein the at least one resistor comprises at least one of a potentiometer and a variable resistor.

10. The temperature control apparatus of claim 4, wherein an output of the transistor is connected to selectively activate or deactivate a solid state relay.

11. The temperature control apparatus of claim 1, further comprising a printed circuit board, wherein the temperature monitoring IC is connected to the printed circuit board, and wherein the insulating material surrounds the printed circuit board and substantially insulates the printed circuit board from ambient heat and electromagnetic interference.

12. The temperature control apparatus of claim 1, wherein the insulating material is embedded with metal particles.

* * * * *